(12) United States Patent
Fernando

(10) Patent No.: US 11,245,281 B2
(45) Date of Patent: Feb. 8, 2022

(54) ELECTRICALLY OPERATED AEROSOL-GENERATING SYSTEM WITH A RECHARGEABLE POWER SUPPLY

(71) Applicant: Philip Morris Products S.A., Neuchatel (CH)

(72) Inventor: Felix Fernando, Old Basing (GB)

(73) Assignee: Philip Morris Products S.A., Neuchatel (CH)

(*) Notice: Subject to any disclaimer, the term of this patent is extended or adjusted under 35 U.S.C. 154(b) by 456 days.

(21) Appl. No.: 16/311,370

(22) PCT Filed: Jun. 23, 2017

(86) PCT No.: PCT/EP2017/065600
§ 371 (c)(1),
(2) Date: Dec. 19, 2018

(87) PCT Pub. No.: WO2018/001910
PCT Pub. Date: Jan. 4, 2018

(65) Prior Publication Data
US 2020/0305513 A1    Oct. 1, 2020

(30) Foreign Application Priority Data

Jun. 29, 2016  (EP) .................................. 16176942

(51) Int. Cl.
*A24F 13/00*  (2006.01)
*H02J 7/34*  (2006.01)
(Continued)

(52) U.S. Cl.
CPC ............. *H02J 7/345* (2013.01); *A24F 40/40* (2020.01); *A24F 40/50* (2020.01); *A24F 40/90* (2020.01);
(Continued)

(58) Field of Classification Search
CPC ....................................................... A24F 47/00
(Continued)

(56) References Cited

U.S. PATENT DOCUMENTS 9,980,520 B2 * 5/2018 Hearn ................... A24F 15/015
2009/0230117 A1   9/2009 Fernando et al.
(Continued)

FOREIGN PATENT DOCUMENTS

GB    2524295 A    9/2015
JP    2010-75032 A    4/2010
(Continued)

OTHER PUBLICATIONS

International Search Report and Written Opinion dated Sep. 28, 2017 in PCT/EP2017/065600 filed Jun. 23, 2017.
(Continued)

*Primary Examiner* — Phuong K Dinh
(74) *Attorney, Agent, or Firm* — Oblon, McClelland, Maier & Neustadt, L.L.P.

(57) ABSTRACT

An electrically operated aerosol-generating system for receiving an aerosol-forming substrate is provided, including one or more electric aerosol-generating elements; one or more hybrid capacitors configured to supply power to the one or more electric aerosol-generating elements; and a voltage source configured to supply power to the one or more hybrid capacitors to charge the one or more hybrid capacitors.

13 Claims, 3 Drawing Sheets

(51) Int. Cl.
*A24F 40/90* (2020.01)
*A24F 40/40* (2020.01)
*H02J 7/00* (2006.01)
*A24F 40/50* (2020.01)
*A24F 40/20* (2020.01)

(52) U.S. Cl.
CPC ...... *H02J 7/0063* (2013.01); *H02J 7/007182* (2020.01); *A24F 40/20* (2020.01)

(58) Field of Classification Search
USPC .................................................. 131/328–329
See application file for complete search history.

(56) References Cited

U.S. PATENT DOCUMENTS

| | | |
|---|---|---|
| 2014/0083443 A1 | 3/2014 | Liu |
| 2014/0270727 A1 | 9/2014 | Ampolini et al. |
| 2015/0181942 A1 | 7/2015 | Holzherr et al. |
| 2015/0216235 A1 | 8/2015 | Liu |
| 2016/0155576 A1 | 6/2016 | Frank |
| 2016/0345634 A1 | 12/2016 | Fernando et al. |
| 2016/0345635 A1 | 12/2016 | Fernando et al. |
| 2017/0086502 A1 | 3/2017 | Hearn et al. |
| 2017/0112191 A1* | 4/2017 | Sur ..................... A61M 11/042 |
| 2018/0020735 A1* | 1/2018 | Bilat ................... H05B 1/0277 131/328 |
| 2018/0140008 A1* | 5/2018 | Sur ..................... G01N 27/048 |

FOREIGN PATENT DOCUMENTS

| | | |
|---|---|---|
| JP | 2011-515080 A | 5/2011 |
| KZ | 30993 B | 3/2016 |
| RU | 2014 131 454 A | 2/2016 |

OTHER PUBLICATIONS

Danilo Porcarelli, et al., "Characterization of Lithium-Ion Capacitors for low-power energy neutral wireless sensor networks," IEEE 2012 Ninth International Conference on Networked Sensing Systems (INSS), XP032206954, 2012, 4 Pages.

Kyoji Nakajo, et al., "Modeling of a Lithium-Ion Capacitor and Its Charging and Discharging Circuit in a Model-Based Design," Circuits and Systems, vol. 7, XP055323805, 2016, pp. 11-22.

David A. Evans, et al., "Hybrid® Capacitor Applications," Eighth International Seminar on Double Layer Capacitors and Similar Energy Storage Devices, Retrieved from the Internet [URL: http://www.evanscap.com/pdf/98SW.pdf], XP007902290, Dec. 1998, 8 Pages.

Japanese Office Action dated Apr. 5, 2021 in Japanese Application No. 2018-565259 (with English translation), 6 pages.

Decision to Grant dated Jul. 24, 2020 in Russian Patent Application No. 2019102208/07 (003885) (with English language translation), 19 pages.

* cited by examiner

ELECTRICALLY OPERATED AEROSOL-GENERATING SYSTEM WITH A RECHARGEABLE POWER SUPPLY

CROSS-REFERENCE TO RELATED APPLICATIONS

This application is a U.S. national stage application of PCT/EP2017/065600, filed on Jun. 23, 2017, which is based upon and claims the benefit of priority from European patent application no. 16176942.7, filed Jun. 29, 2016, the entire contents of each of which are incorporated herein by reference.

TECHNICAL FIELD

The present invention relates to an electrically operated system comprising a rechargeable power supply. In particular, the present invention relates to an electrically operated aerosol-generating system including a primary device, such as a charging device and a secondary device, such as an aerosol-generating device.

DESCRIPTION OF THE RELATED ART

Known electrically operated aerosol-generating systems include an aerosol-generating device having a housing having a cavity for receiving an aerosol-generating article containing an aerosol-forming substrate, heating elements to generate an aerosol, a rechargeable power supply and electronic circuitry to control operation of the system. Such systems often include a charging device having a voltage source, electrically couplable to the device for charging the rechargeable power supply.

Typically, aerosol-generating devices are portable or handheld devices. Portable aerosol-generating devices need to be small and convenient to hold for a user. This leads to several technical requirements for the rechargeable power supply of portable aerosol-generating devices. The rechargeable power supply must be small enough to fit within a handheld device, typically of similar size to a conventional cigarette, and must deliver sufficient power to generate an aerosol from an aerosol-generating article.

Rechargeable batteries, such as secondary lithium ion batteries, have been used as rechargeable power supplies for portable aerosol-generating devices in the prior art. Lithium ion batteries offer greater energy densities than most other rechargeable power supplies, such as capacitors and supercapacitors, but often require long charging periods and need replacement after between 300-500 charging cycles.

It would be desirable to provide an electrically operated aerosol-generating system having a rechargeable power supply that is able to deliver enough power for at least one user experience, typically comprising about 14 puffs, that is able to be quickly, safely and conveniently recharged to a level at which it can be reused for another user experience, and that is operable for thousands of charge cycles.

SUMMARY

According to a first aspect of the present invention, there is provided an electrically operated aerosol-generating system for receiving an aerosol-forming substrate, the system comprising: one or more electric aerosol-generating elements; one or more hybrid capacitors for supplying power to the one or more electric aerosol-generating elements; and a voltage source for supplying power to the one or more hybrid capacitors to charge the one or more hybrid capacitors.

BRIEF DESCRIPTION OF THE DRAWINGS

Embodiments of the invention will now be described in detail, with reference to the accompanying drawings, in which.

DETAILED DESCRIPTION

Figure 1:
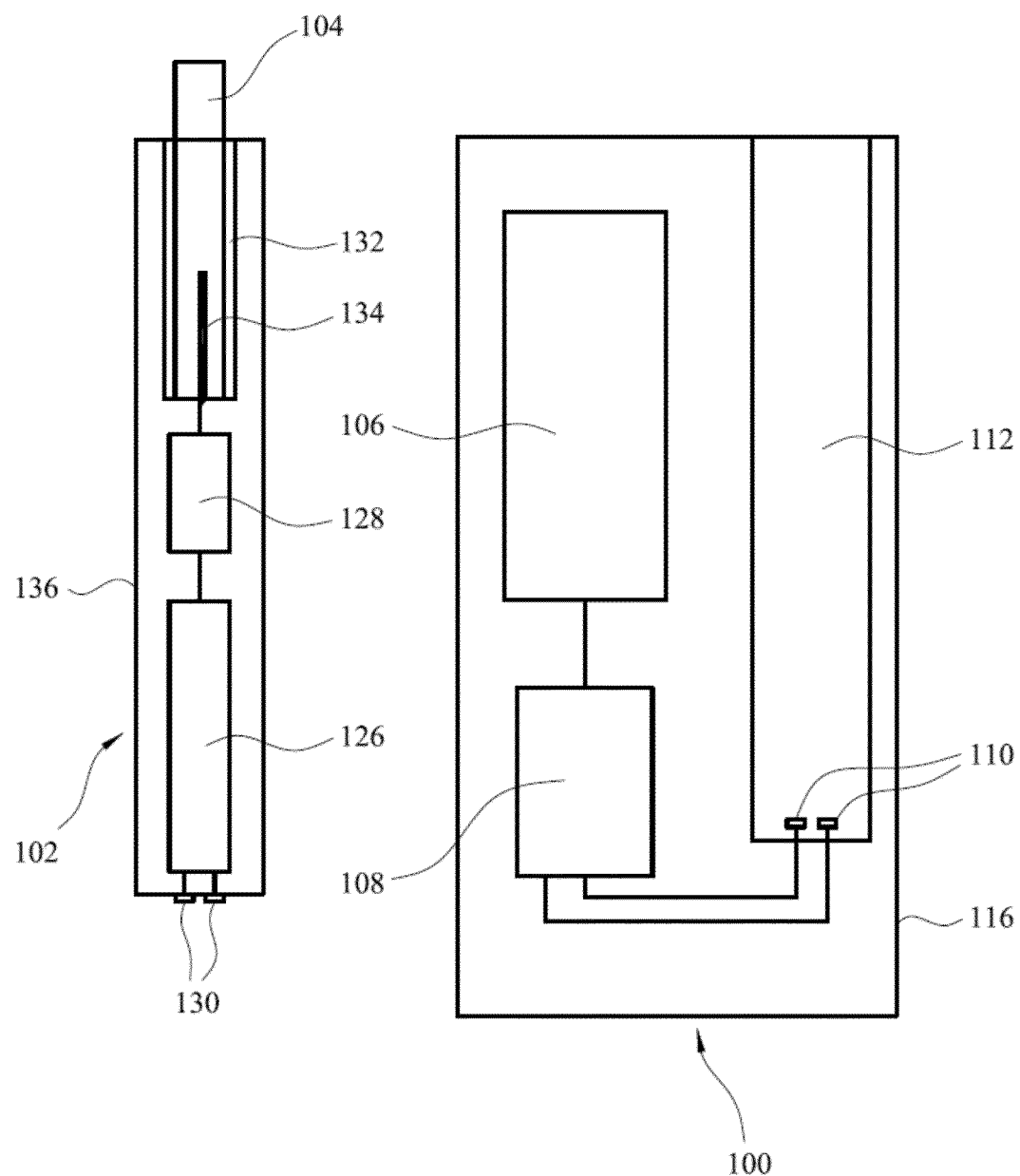
FIG. 1 is a schematic illustration of an electrically operated aerosol-generating system according to the present invention comprising an aerosol-generating device having a hybrid capacitor power supply and an associated charging device including a charging battery.

As used herein, a "hybrid capacitor" is an electrochemical energy storage device that comprises two asymmetric electrodes and an electrolyte between the two electrodes. In other words, a "hybrid capacitor" comprises two different types of electrode arranged in an electrolyte. One electrode of a hybrid capacitor may exhibit predominantly electrostatic capacitance, and the other electrode may exhibit predominantly electrochemical capacitance. For example, one of the electrodes may be a double-layer (non-faradaic) electrode and the other electrode may be a redox (faradaic) electrode. Preferably, the hybrid capacitor is a lithium ion capacitor.

As used herein, a "lithium ion capacitor" is a hybrid capacitor comprising an anode of graphitic material, such as graphite or hard carbon, having intercalated lithium ions and a cathode of a porous carbon material, such as activated carbon. The electrolyte may be a lithium-ion salt solution. The electrolyte may be similar to electrolytes used in lithium ion batteries.

One suitable hybrid capacitor is the 40 F, LIC1235R 3R8406, lithium ion capacitor commercially available from TAIYO YUDEN (U.S.A.) INC. This lithium ion capacitor is a cylindrical capacitor, having a diameter of 12.5 mm and a length of 35.0 mm. This lithium ion capacitor has a maximum usable voltage of 3.8 V, a minimum usable voltage of 2.2 V and an internal resistance of about 150 mΩ.

Another suitable hybrid capacitor is the 100 F, LIC1840R 3R8107, lithium ion capacitor commercially available from TAIYO YUDEN (U.S.A.) INC. This lithium ion capacitor is a cylindrical capacitor, having a diameter of 18.0 mm and a length of 40.0 mm. This lithium ion capacitor has a maximum usable voltage of 3.8 V, a minimum usable voltage of 2.2 V and an internal resistance of about 100 mΩ.

The energy density of a hybrid capacitor, such as a lithium ion capacitor, is typically lower than the energy density of a battery, such as a lithium ion battery. As such, the energy storage capacity of a hybrid capacitor may be lower than the capacity of a battery of equivalent size. However, the power density of a hybrid capacitor is typically higher than the power density of a battery. In other words, hybrid capacitors are able to be charged and discharged quickly compared to batteries of equivalent size, typically in a number of seconds rather than minutes. As such, hybrid capacitors are ideal power supplies for providing pulses of high power to aerosol-generating elements of portable aerosol-generating devices.

The cycle life of a hybrid capacitor is also typically significantly greater than the cycle life of a typical battery. In particular, the cycle life of a lithium ion capacitor is typically significantly greater than the cycle life of a lithium ion battery. The cycle life of a lithium ion capacitor is typically greater than 10 000 cycles before the lithium ion capacitor requires replacement, compared to about 500 cycles for a lithium ion battery before the lithium ion battery requires replacement.

Hybrid capacitors advantageously also typically exhibit a lower rate of self-discharge than most capacitors and supercapacitors.

The system may comprise any suitable number and arrangement of hybrid capacitors. The electrically operated aerosol-generating system may comprise one or more hybrid capacitors. However, preferably the system comprises a single hybrid capacitor. Where the system comprises more than one hybrid capacitor, the hybrid capacitors may be arranged in series or in parallel or in groups of hybrid capacitors, the hybrid capacitors in a group being arranged in series and the groups of hybrid capacitors being arranged in parallel.

In preferred embodiments, a user may puff on the aerosol-generating system to trigger the generation of aerosol. When a user's puff is detected by the electric circuitry of the aerosol-generating device, power may be supplied to the one or more aerosol-generating elements. The duration of a user's puff may be between about 1 s and about 6 s, between about 2 s and about 5 s, or about 3 s. The average power per puff required for the one or more aerosol-generating elements to generate a suitable aerosol may be between about 10 W and about 2 W, but preferably is about 5 W. As such, the average energy per puff consumed by the aerosol-generating elements of the aerosol-generating article may be about 15 J for a puff of about 3 s. A typical user experience comprises more than one puff, may comprise between about 5 and about 20 puffs and preferably comprises about 14 puffs. As such, the one or more hybrid capacitors of the aerosol-generating device of these preferred embodiments may be required to store at least 210 J of energy to provide the aerosol-generating device with sufficient energy for a single user experience of about 14 puffs, with each puff consuming about 15 J.

The electrically operated aerosol-generating system of the present invention may comprise a primary device and a secondary device. The primary device may be a charging device and the secondary device may be an aerosol-generating device. The charging device may comprise the voltage source. The aerosol-generating device may comprise the one or more electric aerosol-generating elements; and the one or more hybrid capacitors. Typically, the aerosol-generating device is a portable device or a handheld device. The aerosol-generating device may generally have the shape and dimensions of a conventional cigarette or cigar. In some embodiments, the charging device may be a portable device or a handheld device. The charging device may generally have the shape and dimensions of a conventional packet of cigarettes.

The charging device may comprise electric circuitry configured to control the supply of power from the voltage source to the one or more hybrid capacitors. The electric circuitry of the charging device may comprise a microprocessor. The electric circuitry of the charging device may comprise a voltage regulator between the voltage source and the one or more hybrid capacitors. The microprocessor may be configured or programmed to control the voltage regulator to control the supply power from the voltage source to the one or more hybrid capacitors.

The aerosol-generating device may comprise electric circuitry configured to control the supply of power from the one or more hybrid capacitors to the one or more electric aerosol-generating elements. The electric circuitry of the aerosol-generating device may comprise a microprocessor. The electric circuitry of the aerosol-generating device may comprise a voltage regulator between the one or more hybrid capacitors and the one or more aerosol-generating elements. The microprocessor may be configured or programmed to control the voltage regulator to control the supply power from the one or more hybrid capacitors to the one or more aerosol-generating elements.

The electric circuitry of the charging device may be configured or programmed to supply power from the voltage source to the one or more hybrid capacitors during a charging mode and the electric circuitry of the aerosol-generating device may be configured or programmed to supply power from the one or more hybrid capacitors to the one or more aerosol-generating elements during a heating mode.

The electric circuitry of the charging device may be configured to supply power from the voltage source to the one or more hybrid capacitors at a constant current until the voltage reaches a predetermined value during the charging mode. The constant current and the predetermined voltage value may be set by the properties of the hybrid capacitor.

If the charging current is removed as soon as the predetermined maximum voltage value is reached, the internal resistance of the one or more hybrid capacitors may cause the voltage of the one or more hybrid capacitors to drop. As such, if the charging current is removed as soon as the predetermined maximum voltage value is reached, charging of the one or more hybrid capacitors is terminated before the one or more hybrid capacitors are fully charged.

The electric circuitry of the charging device may be configured to continue to charge the one or more hybrid capacitors after the predetermined maximum voltage value has been reached to compensate for the voltage drop caused by the internal resistance of the one or more hybrid capacitors. In particular, the electric circuitry of the charging device may be configured to supply power from the voltage source to the one or more hybrid capacitors at a constant voltage in the charging mode. Preferably the constant voltage value is the same as the predetermined voltage value.

As the one or more hybrid capacitors approach a fully charged state, the charging current may reduce. When the charging current reaches zero, the one or more hybrid capacitors are fully charged.

In preferred embodiments, the electric circuitry of the charging device may be configured to supply power from the voltage source to the one or more hybrid capacitors at a constant current until the voltage reaches a predetermined maximum voltage value, and subsequently to supply power from the voltage source to the one or more hybrid capacitors at a constant voltage until the current reaches a minimum current threshold value in the charging mode.

In other words, the one or more hybrid capacitors may be charged using a constant current phase followed by a constant voltage phase. In the constant current phase, the voltage across the hybrid capacitor is adjusted to maintain a constant charging current $I_{ch}$ until the voltage across the hybrid capacitor reaches a determined voltage limit, the predetermined maximum voltage value $V_{ch}$, with $I_{ch}$ and $V_{ch}$ set by the properties of the one or more hybrid capacitors. In the constant voltage phase, the voltage across the one or more hybrid capacitors is maintained at a constant voltage value $V_{ch}$ either until the current drops to zero, at which point the one or more hybrid capacitors are fully charged, or until the charging current drops below a predetermined minimum current threshold value $I_{low}$. The lower the predetermined minimum current threshold value $I_{low}$, the longer the minimum required charging time will be for the one or more hybrid capacitors but the closer the one or more hybrid capacitors will be to a fully charged state.

For rapid charging, it is desirable to maximise the length of the constant current phase, and minimise the time of the constant voltage phase. The predetermined minimum current threshold value $I_{low}$ may be set at a value at which the one or more hybrid capacitors have a state of charge that is sufficient to supply energy to the one or more aerosol-generating elements for a single aerosol-generating session. A single aerosol-generating session may comprise between one and twenty puffs. Preferably, a single aerosol-generating session comprises about 14 puffs.

The electric circuitry of the aerosol-generating device may be configured to indicate to a user when the predetermined minimum current threshold value $I_{low}$ has been reached. For example, the electric circuitry of the aerosol-generating device may comprise an LED, such as a green LED, and the electric circuitry may be configured to illuminate the LED when the predetermined minimum current threshold value $I_{low}$ has been reached. As such, a user may be able to determine when the one or more hybrid capacitors of the aerosol-generating device hold sufficient charge to supply an aerosol-generating session.

The charging device may be configured to continue to charge the one or more hybrid capacitors after the predetermined minimum current threshold value $I_{low}$ has been reached, either until the current reaches zero and the one or more hybrid capacitors are fully charged or until the aerosol-generating device is removed from the charging device by a user. The charging device may be configured to continue to charge the one or more hybrid capacitors at a charging constant voltage.

The constant charging current $I_{ch}$ may be between about 0.5 A and about 5 A. Preferably, the constant charging current $I_{ch}$ is about 2 A. The predetermined maximum voltage value $V_{ch}$ may be between about 1 V and 5 V. Preferably, the predetermined maximum voltage value $V_{CH}$ is about 3.8 V. The predetermined minimum current threshold value $I_{low}$ may be between about 10 mA and about 300 mA, may be between about 20 mA and about 200 mA, or may be about 50 mA.

The electrical circuitry of the charging device may be configured to periodically compare the output voltage of the one or more hybrid capacitors with the predetermined minimum threshold voltage during charging of the hybrid capacitor.

The charging device may comprise a power converter connected between the battery and the hybrid capacitor. The electrical circuitry of the charging device may be configured to reduce the current to the one or more hybrid capacitors by reducing the duty cycle of voltage pulses applied to the power converter from the voltage source. The electrical circuitry of the charging device may be configured to reduce the current to the one or more hybrid capacitors by not applying a pulse of voltage to the power converter.

As the one or more hybrid capacitors are charged in the constant current phase, the charging voltage must increase to compensate for the increasing voltage of the hybrid capacitor. Accordingly, the constant current phase requires a minimum charging voltage to be available from the charging voltage source.

The one or more hybrid capacitors are ideal power supplies for providing pulses of high power to aerosol-generating elements of portable aerosol-generating devices. The electric circuitry of the aerosol-generating device may be configured to supply power from the one or more hybrid capacitors to the one or more aerosol-generating elements in pulses during the heating mode. The pulses may have a predetermined duration. The duration of each pulse may be the duration of a puff. The duration of each pulse may be less than the duration of a puff. More than one pulse may be supplied to the one or more heating elements over the duration of a puff. The duration of the pulses may be between about 100 µs and about 5 s. The frequency of the pulses may be between about 0.2 Hz and about 1 kHz.

The electric circuitry of the aerosol-generating device may be configured to adjust the power supplied to the one or more aerosol-generating elements.

The electric circuitry of the aerosol-generating device may be configured to adjust the supply of power to the one or more aerosol-generating elements by pulse frequency modulation. Pulse frequency modulation consists of varying the frequency of the pulses whilst maintaining a constant pulse width.

The electric circuitry of the aerosol-generating device may be configured to adjust the supply of power to the one or more aerosol-generating elements by pulse width modulation. Pulse width modulation consists of varying the duty cycle at constant frequency. The duty cycle is the ratio of the time that the power is switched on to the time the power is switched off. In other words, the ratio of the width of the voltage pulses to the time between the voltage pulses. A low duty cycle of 5% will provide much less power than a duty cycle of 95%.

The voltage of a hybrid capacitor varies linearly with the charge stored in the one or more hybrid capacitors. As such, the voltage of a hybrid capacitor decreases as the charge of the hybrid capacitor decreases. The electric circuitry of the aerosol-generating device may be configured to adjust the supply of power to the one or more aerosol-generating elements as the one or more hybrid capacitors are discharged to maintain a constant supply of energy to the aerosol-generating elements. The electric circuitry of the aerosol-generating device may be configured to adjust the supply of power to the one or more hybrid capacitors using pulse frequency modulation or pulse width modulation.

The electric circuitry of the aerosol-generating device may be configured to adjust the supply of power to the one or more aerosol-generating elements over the duration of a puff. In some embodiments, the electric circuitry of the aerosol-generating device may be configured to supply a high or maximum power to the one or more aerosol-generating elements at the beginning of a puff and to reduce the power supplied to the one or more aerosol-generating elements to a low or minimum power at the end of the puff. This may decrease the amount of energy consumed in a single puff, whilst maintaining acceptable aerosol generating throughout a puff. This may reduce the build-up of condensation in the aerosol-generating device by reducing the generation of aerosol towards the end of a puff.

The high power and the low power values may be any suitable power values for generating an acceptable aerosol from the aerosol-generating system. For example, the high power may be between about 18 W and about 5 W and the low power may be between about 8 W and about 2 W. For example, the electric circuitry of the aerosol-generating device may be configured to supply a high power of about 10 W to the one or more aerosol-generating elements for a first period of about 1.5 s when a puff is detected, and to subsequently supply a lower power of about 5 W to the one or more aerosol-generating elements for a second period of about 1.5 s.

The electric circuitry of the aerosol-generating device may be configured to adjust the supply of power to the one or more aerosol-generating elements over the duration of a puff by pulse frequency modulation or by pulse width modulation.

The electric circuitry of the aerosol-generating device may be configured to reduce the power supplied to the one or more aerosol-generating elements from a high power to a low power incrementally over the duration of a puff. The electric circuitry of the aerosol-generating device may be configured to reduce the power supplied to the one or more aerosol-generating elements from a high power to a low power in two or more stages over the duration of a puff. The electric circuitry of the aerosol-generating device may be configured to reduce the power supplied to the one or more aerosol-generating elements in between two and six stages during a puff.

The duration of each stage may be the same. The duration of each stage may be different. The duration of each stage may be between about 0.2 s and about 1.5 s, or about 0.75 s.

The magnitude of the reduction of power at each stage or increment may be the same for each stage. The magnitude of the reduction of power at each stage may be different for each stage. The magnitude of the reduction of power at each stage may be between about 0.5 W and about 4 W, or about 2 W.

In some embodiments, the magnitude of the reduction of power may increase at each stage over the duration of a puff. For example, the electric circuitry of the aerosol-generating device may be configured reduce the power supplied to the electric aerosol-generating elements in three stages over the duration of a 3 s puff, by: initially supplying 10 W to the one or more electric aerosol-generating elements when a puff is detected for a first period of 0.75 s; supplying 9 W to the one or more electric aerosol-generating elements for a second period of 0.75 s; supplying 7 W to the one or more electric aerosol-generating elements for a third period of 0.75 s; and supplying 3 W to the one or more electric aerosol-generating elements for a fourth period of 0.75 s.

In other embodiments, the magnitude of the reduction may decrease at each stage over the duration of a puff.

In some embodiments, the electric circuitry of the aerosol-generating device is configured to monitor the temperature of the one or more aerosol-generating elements. The electric circuitry of the aerosol-generating device may be further configured to adjust the supply of power to the one or more aerosol-generating elements based on the temperature of the one or more aerosol-generating elements.

The electric circuitry of the aerosol-generating device may be configured to determine the state of charge of the one or more hybrid capacitors. In other words, the electric circuitry of the aerosol-generating device may be configured to determine the amount of energy stored in the one or more hybrid capacitors. The electric circuitry of the aerosol-generating device may be configured to determine the state of charge of the one or more hybrid capacitors based on measurements of voltage across the one or more hybrid capacitors. The relationship between the stored energy and the voltage may be determined using equation 1, as follows:

$$E = \tfrac{1}{2} C V^2 \qquad \text{Equation 1}$$

where E is the energy stored in the hybrid capacitor, C is the capacitance of the hybrid capacitor and V is the voltage of the hybrid capacitor. The straightforward relationship of stored energy to voltage may enable accurate estimates of the state of charge of the one or more hybrid capacitors to be made.

The electric circuitry of the aerosol-generating device may be configured or programmed to determine the amount of energy stored in the one or more hybrid capacitors. The electric circuitry of the aerosol-generating device may be configured or programmed to determine the percentage charge remaining in the one or more hybrid capacitors. The electric circuitry of the aerosol-generating device may be configured or programmed to determine the number of puffs remaining based on the average energy of a puff and the determined amount of energy stored in the one or more hybrid capacitors.

The electric circuitry of the aerosol-generating device may be configured to indicate the state of charge of the one or more hybrid capacitors to a user, for example as a number on a display on the housing of the device, or as a number of illuminated LEDs on the housing of the device.

The aerosol-generating device and the charging device may be electrically connected to each other during the charging mode and electrically disconnected from each other during the heating mode. The electrical connection may be a physical connection, for example between two opposing electrical contacts or may be an inductive connection, for example an inductive coupling between two parallel coils.

In some embodiments, the aerosol-generating device and the charging device may be physically coupled during the charging mode, such that electrical contacts of the aerosol-generating device contact electrical contacts of the charging device.

The electrical contacts of the aerosol-generating device may be the same as the electrodes of the charging device. The electrical contacts of the aerosol-generating device may be different to the electrodes of the charging device. The electrical contacts may be any suitable shape, such as ring contacts, point contacts or plate contacts. The electrical contacts may be sprung to bias or urge the contact into physical contact with the opposing contact of the other device.

In some embodiments, the electrical contacts of the aerosol-generating device may be ring contacts, circumscribing the aerosol-generating device. In some embodiments, the electrical contacts of the charging device may be ring electrodes circumscribing a cavity of the charging device that is configured to receive the aerosol-generating device in the charging mode. Providing ring electrodes on at least one of the aerosol-generating device and the charging device may eliminate the need to maintain a specific rotational orientation of the aerosol-generating device relative to the charging device when coupling the aerosol-generating device and the charging device.

In some embodiments, the aerosol-generating device and the charging device may be inductively coupled during the charging mode.

The system may comprise alignment means to facilitate alignment of the aerosol-generating device and the charging device in a charging position, wherein the electrical contacts of the aerosol-generating device are in contact with the electrical contacts of the charging device or the aerosol-generating device is inductively coupled to the charging device.

In some embodiments, the system may comprise magnetic alignment means. For example, the aerosol-generating device may comprise a first magnetic material and the charging device may comprise a second magnetic material, the second magnetic material being configured to magnetically attract the first magnetic material. The term 'magnetic material' is used herein to describe a material which is able to interact with a magnetic field, including both paramagnetic and ferromagnetic materials. A magnetic material may be a paramagnetic material, such that it only remains magnetised in the presence of an external magnetic field. A magnetic material may be a material which becomes magnetised in the presence of an external magnetic field and which remains magnetised after the external field is removed (such as a ferromagnetic material, for example). The term 'magnetic material' as used herein encompasses both types of magnetisable material, as well as material which is already magnetised.

The first magnetic material and the second magnetic material may be arranged such that the first magnetic material is adjacent to or in close proximity to the second material when the aerosol-generating device and the charging device are in the charging position. The first magnetic material and the second magnetic material may be configured such that the attractive magnetic force between the first magnetic material and the second magnetic material may hold the aerosol-generating device and the charging device in the charging position. The attractive magnetic force between the first magnetic material and the second magnetic material may also draw the aerosol-generating device into the charging position when the aerosol-generating device is arranged in close proximity to the charging device and the charging position.

The electric circuitry of the aerosol-generating device and the electric circuitry of the charging device may be configured to communicate with each other in the charging mode. The electric circuitry of the aerosol-generating device may be configured to send signals to the charging device and the electric circuitry of the charging device may be configured to receive signals from the electric circuitry of the aerosol-generating device. The electric circuitry of the charging device may be configured to send signals to the aerosol-generating device and the electric circuitry of the aerosol-generating device may be configured to receive signals from the electric circuitry of the charging device. The signals may be sent via the physical or inductive connection between the aerosol-generating device and the charging device when the aerosol-generating device and the charging device are physically or inductively coupled.

The voltage source of the charging device may be a DC voltage source. The voltage source may be a rechargeable voltage source. The voltage source may be a battery. Preferably, the voltage source is a rechargeable lithium ion battery. The lithium ion battery may be rechargeable from a mains power supply. The lithium ion battery may be configured to hold sufficient charge to recharge the one or more hybrid capacitors several times before needing to be recharged. The lithium battery may hold sufficient charge to enable the one or more hybrid capacitors of the device to be charged 2, 3, 4, 5, 6 or 7 times. The battery may be a lithium cobalt oxide (LiCoO2) battery. The battery may be a prismatic, cylindrical or pouch type. The battery may have a capacity of between 1000 mAh and about 2000 mAh.

Where the voltage source is a rechargeable voltage source, the electrical circuitry of the charging device may comprise means for electrically connecting the charging device to an external power supply for recharging the battery. The external power supply may be a mains or wall power supply.

In some embodiments, the electrical circuitry of the charging device may comprise means for physically connecting the charging device to the external power supply. For example, the charging device may comprise a connector, such as a USB port.

In some embodiments, the electrical circuitry of the charging device may comprise means for inductively coupling the charging device to an external power supply. For example, the charging device may comprise one or more ring connectors or coils.

The charging device and the aerosol-generating device may comprise housings. The housing may be made of the same material. The housings may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

According to a second aspect of the present invention, there is provided an aerosol-generating device for an electrically operated aerosol-generating system, the device comprising: a housing having a cavity for receiving an aerosol-generating article comprising an aerosol-forming substrate; one or more electric aerosol-generating elements; and one or more hybrid capacitors for supplying power to the one or more electric aerosol-generating elements.

The aerosol-generating device may further comprise electric circuitry configured to control the supply of power from the one or more hybrid capacitors to the one or more electric aerosol-generating elements, the one or more hybrid capacitors being discharged through the one or more aerosol-generating elements in a heating mode.

The electric circuitry of the aerosol-generating device may comprise a puff detector for detecting a user puffing on the aerosol-generating system.

In some embodiments, the aerosol-generating elements of the aerosol-generating device may be electric heating elements, such as resistive or inductive heating elements. In other embodiments, the aerosol-generating elements may be vibratable elements or any other type of element suitable for atomising an aerosol-forming substrate of an aerosol-generating article.

The electric circuitry of the aerosol-generating device may be further configured to communicate to an external device, such as a phone or a personal computer. The electric circuitry of the aerosol-generating device may be configured to send usage or charging data to the external device. The electric circuitry of the aerosol-generating device may be configured to communicate wirelessly with an external device. For example, the electric circuitry of the aerosol-generating device may comprise a Bluetooth® transceiver. The electric circuitry of the aerosol-generating device may comprise an electrical connector, such as a USB port, for connection to an external device.

The electric circuitry of the charging device may be further configured to communicate to an external device, such as a phone or a personal computer. The electric circuitry of the charging device may be configured to send usage or charging data to the external device. The electric circuitry of the charging device may be configured to communicate wirelessly with an external device. For example, the electric circuitry of the charging device may comprise a Bluetooth® transceiver. The electric circuitry of the charging device may be configured to communicate with an external device via the means for electrically connecting the charging device to an external power supply.

According to a third aspect of the present invention, there is provided a method of charging an aerosol-generating device comprising a hybrid capacitor power supply. The method comprises: comparing an output voltage of the hybrid capacitor with a threshold voltage; when the output voltage from the hybrid capacitor is equal to or greater than the threshold voltage, charging the hybrid capacitor using a constant first current, and reducing the charging current when either the charging voltage applied to the hybrid capacitor reaches a maximum permitted voltage or the output voltage from the battery is less than the threshold voltage; and when the charging voltage applied to the hybrid capacitor reaches a maximum permitted voltage or the output voltage from the battery is less than the threshold voltage, reducing the charging current to maintain the charging voltage applied to the battery at or close to the maximum permitted voltage.

According to a fourth aspect of the present invention, there is provided a method of operating an aerosol-generating device comprising one or more aerosol-generating elements and one or more hybrid capacitors configured to supply power to the one or more aerosol-generating elements, the method comprising: detecting a puff from a user on the aerosol-generating device; and supplying power from the one or more hybrid capacitors to the one or more aerosol-generating elements in pulses of a given time when a puff from a user is detected.

The system, device and methods in accordance with the first, second and third aspects of the present invention may be applied to electronically operate smoking systems. The charging device may be used to charge a hybrid capacitor in an electronically operated smoking device. The electronically operated smoking device may include one or more electrically powered heaters configured to heat an aerosol-forming substrate. The aerosol-forming substrate may be provided in the form of a cigarette having a mouthpiece portion on which an end user inhales. The hybrid capacitor may advantageously provide sufficient power for a single smoking session, exhausting a single aerosol-forming substrate.

It should be clear that features described in relation to one aspect of the disclosure may be applied to other aspects of the disclosure, alone or in combination with other described aspects and features of the disclosure.

FIG. 1 shows a primary device 100 and a secondary device 102 having a rechargeable power supply. The primary device 100 in this example is a charging unit for an electrically operated aerosol-generating device. The secondary device 102 in this example is an electrically operated aerosol-generating device adapted to receive an aerosol-generating article 104 comprising an aerosol-forming substrate. The aerosol-generating device 102 includes a heater 134 to heat the aerosol forming substrate in operation. The user inhales on a mouthpiece portion of the aerosol-generating article 104 to draw aerosol into the user's mouth. The aerosol-generating device 102 is configured to be received within a cavity 112 in the charging device 100 in order to recharge the power supply in the aerosol-generating device 102.

The charging device 100 comprises battery 106, electrical circuitry 108, and electrical contacts 110 configured to provide electrical power from the battery 106 to a rechargeable power supply in the aerosol-generating device 102 when the aerosol-generating device 102 is in connection with the electrical contacts 110. The electrical contacts 110 are provided adjacent the bottom of a cavity 112. The cavity is configured to receive the aerosol-generating device 102. The components of the charging device 100 are housed within the housing 116.

The aerosol-generating device 102 comprises a rechargeable power supply in the form of a hybrid capacitor 126, secondary electrical circuitry 128 and electrical contacts 130. As described above, the hybrid capacitor 126 of the aerosol-generating device 102 is configured to receive a supply of power from the battery 106 when the electrical contacts 130 are in contact with the electrical contacts 110 of the charging device 100. The aerosol-generating device 102 further comprises a cavity 132 configured to receive the smoking article 104. A heater 134, in the form of, for example, a blade heater, is provided at the bottom of the cavity 132. In use, the user activates the aerosol-generating device 102, and power is provided from the hybrid capacitor 126 via the electrical circuitry 128 to the heater 134. The heater is heated to a standard operational temperature that is sufficient to generate an aerosol from the aerosol-forming substrate of the aerosol-generating article 104. The components of the aerosol-generating device 102 are housed within the housing 136. An aerosol-generating device of this type is described more fully in EP2110033 for example.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco.

In this example, the aerosol-generating device 102 is a portable electrically operated aerosol-generating device. As such, the aerosol-generating device 102 is required to be small (conventional cigarette size) so that it may be held in the hand of a user, but is also required to deliver high power over a period of just a few seconds for each puff taken by a user on the mouthpiece of the aerosol-generating article 104. Typically, the aerosol-generating device 102 must deliver high power for around 3 seconds per puff, and for 14 puffs in a single user experience. The hybrid capacitor 126 may then need to be returned to the charging device 100 for recharging. Recharging is desirably completed, at least to a level sufficient to allow for another complete smoking experience, in a matter of a few minutes and preferably less than one minute.

The battery 106 in the charging device is a lithium ion battery. The battery 106 is configured to hold sufficient charge to recharge the hybrid capacitor 126 several times before needing recharging itself. This provides the user with a portable system that allows for several user experiences before recharging from a mains outlet is required.

The hybrid capacitor 126 in this example is hybrid capacitor is the 40 F, LIC1235R 3R8406, lithium ion capacitor commercially available from TAIYO YUDEN (U.S.A.) INC. The hybrid capacitor 126 is a cylindrical capacitor, having a diameter of 12.5 mm and a length of 35.0 mm. The hybrid capacitor 136 is able to undergo 10 000 cycles of charge/discharge at more than 280 J per cycle. The average power delivered by the hybrid capacitor per puff is about 5 W, delivering about 15 J to the heater 134 over a period of about 3 s.

The battery 106 in the charging device 100 is a lithium cobalt oxide (LiCoO2) battery of the prismatic type. The battery has a capacity of around 1350 mAh. Charging of the battery can be performed from a mains supply, at a rate between 0 and 1.5 C, and typically at a rate of around 0.5 C to maximise battery life.

Figure 2:
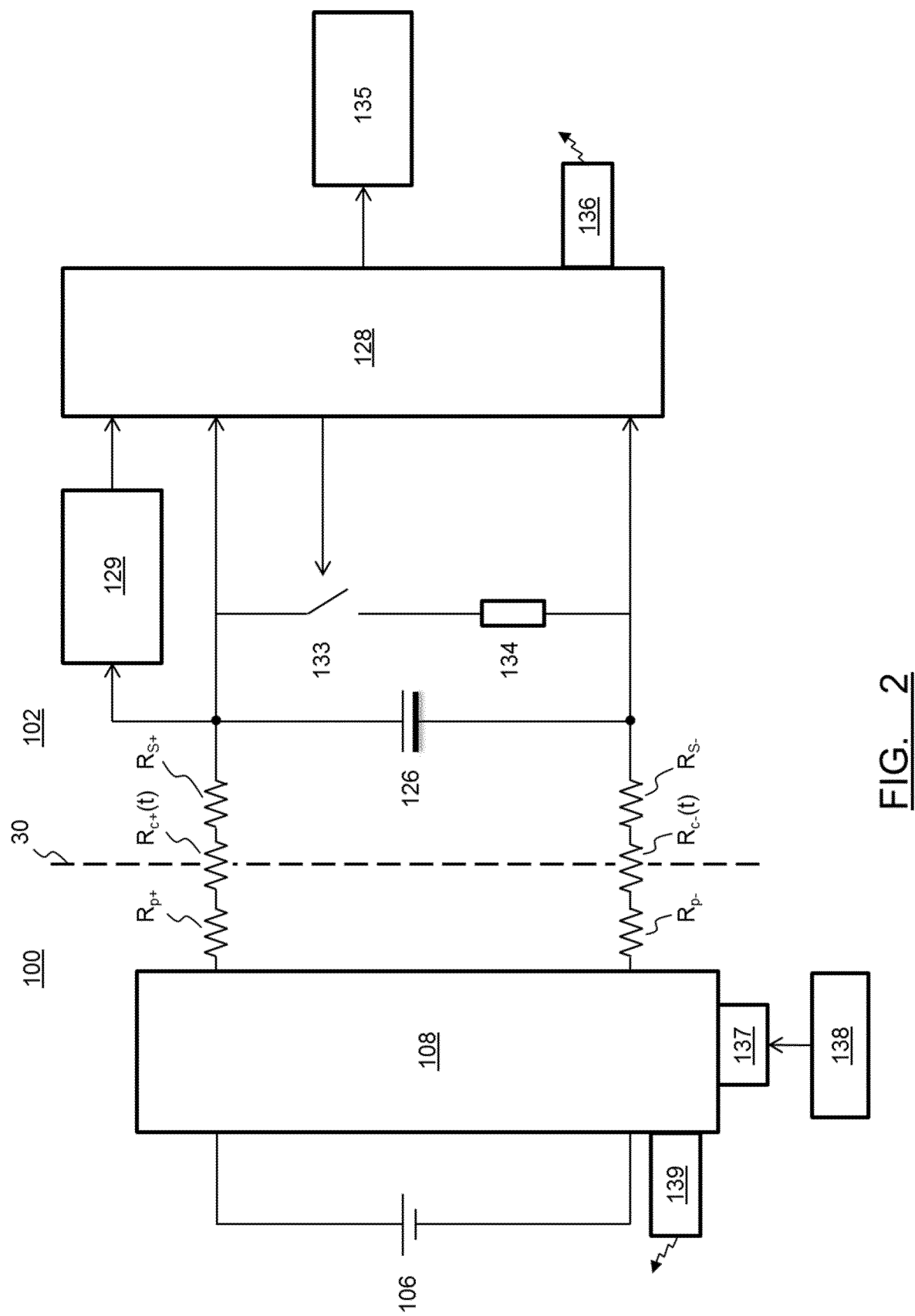
FIG. 2 is a circuit diagram illustrating the charging system of the electrically operated aerosol-generating system of FIG. 1.

FIG. 2 is a circuit diagram illustrating the charging circuit formed by the coupled charging device 100 and aerosol-generating device 102. The circuit is divided in a charging device side and an aerosol-generating device side. Dotted line 30 represents the boundary between the charging device 100 and the aerosol-generating device 102. The charging device side comprises a controlled voltage source, comprising the battery 106, and a microcontroller 108. The microcontroller 108 is configured to control the power supplied to the hybrid capacitor 126 from the battery 106 based on current and voltage measurements across the hybrid capacitor 126. The aerosol-generating device side comprises the hybrid capacitor 126.

The internal resistance of the charging circuit comprises contributions from several sources. The resistances $r_{p-}$ and $r_{p+}$ represent the electrical resistances of the electronics layout and solder tabs in the charging device 100. The resistances $r_{s-}$ and $r_{s+}$ represent the electrical resistances of the electronics layout and solder tabs in the aerosol-generating device 102. The resistances $r_{c-}(t)$ and $r_{c+}(t)$ represent the electrical resistances of the contacts between the primary and aerosol-generating devices. They will vary from device to device and can vary with time from charge cycle to charge cycle. In an electrically operated aerosol-generating system of the type described with reference to FIG. 1, the charging device 100 and portable aerosol-generating device 102 may be brought in and out of contact several times a day, and each time the contact resistances may be different. The contact resistances may also increase if the contacts are not kept clean. The resistance $r_i(t)$ represents the internal resistance of the hybrid capacitor 126.

The contact resistances $r_{c-}(t)$ and $r_{c+}(t)$ may be determined from measurements of the voltage across the hybrid capacitor 126. The microcontroller 128 of the aerosol-generating device 102 is configured to measure the voltage across the hybrid capacitor 126 and communicate, via the contacts, the measured voltage across the hybrid capacitor 126 to the microcontroller 108 of the charging device 100. The microcontroller 108 of the charging device 100 is configured to use the measured voltage across the hybrid capacitor 126 to determine the contact resistances $r_{c-}(t)$ and $r_{c+}(t)$. It will be appreciated that in other embodiments, the microcontroller 128 of the aerosol-generating device 102 may be configured to use the measured voltage across the hybrid capacitor 126 to determine the contact resistances and communicate the contact resistances to the microcontroller 108 of the charging device 100.

If the parasitic resistances $r_{p-}$, $r_{p+}$, $r_{s-}$, $r_{s+}$, $r_{c-}(t)$ and $r_{c+}(t)$ are combined into a single resistance R(t), then the voltage across the hybrid capacitor 126 will be less than the charging voltage from the voltage source by $V_{drop}=I*R(t)$.

This means that the charging voltage supplied by the voltage source can be increased above the maximum $V_{ch}$ by an amount I*R(t) and the voltage across the hybrid capacitor 126 will be equal to $V_{ch}$. The constant current phase of the charging profile can be extended until the point that the charging voltage reaches $V_{ch}+I*R(t)$. The charging voltage supplied thereafter can also be controlled to be more then $V_{ch}$ but no more than $V_{ch}+I*R(t)$. As such, the microcontroller 108 of the charging device 100 may be configured to control the charging voltage supplied by the voltage source to the hybrid capacitor 126 to compensate for the voltage drop $V_{drop}$ across the hybrid capacitor 126.

The charging device side may comprise a voltage regulator (not shown), such as a switch mode power converter, between the battery 106 and the hybrid capacitor 126. The microcontroller 108 may be configured to control the switching of a switch within the switch mode power converter and thereby regulate the voltage and current applied to the hybrid capacitor 126. The switch mode power converter may be an integrated buck-boost converter.

The charging device 100 comprises a charging port 137, such as a USB port, for connection of the charging device 100 to an external power supply 138, such as a mains power supply. The charging device 100 may be connected to an external power supply to recharge the battery 106. It will be appreciated that in other embodiments the charging device may comprise one or more charging coils for inductive coupling to charging coils of an external power supply for recharging the battery 106.

The microcontroller 108 also comprises a Bluetooth® module 139 for sending charge and usage data to other devices, such as a user's phone or computer for tracking usage of the charging device.

The aerosol-generating device side 102 comprises a microcontroller 128 that controls the supply of power from the hybrid capacitor 126 to the heater 134. The microcontroller 128 comprises a puff detector (not shown) and is configured to detect when a user puffs on the mouthpiece of the aerosol-generating article 104. The microcontroller 128 is powered by the hybrid capacitor 126; however, a voltage regulator 129 is provided between the hybrid capacitor 126 and the microcontroller 128 to protect the voltage sensitive components of the microcontroller. The voltage regulator 129 maintains the voltage supplied to the microcontroller 128 from the hybrid capacitor 126 below a threshold level, typically about 1.8 V.

The microcontroller 128 controls a switch 133 for completing the circuit between the hybrid capacitor 128 and the heater 134 to discharge the hybrid capacitor 126 through the heater. This provides a high power pulse to the heater 134 for generating aerosol from the aerosol-forming substrate of the aerosol-generating article 104. The microcontroller 128 is configured to close the switch 133 and supply power to the heater 134 when the microcontroller 128 detects a user's puff on the mouthpiece of the aerosol-generating article 104.

The microcontroller 128 is also configured to periodically determine the state of charge of the hybrid capacitor 126. The microcontroller 128 is configured to determine the state of charge of the hybrid capacitor 126 based on measurements of voltage across the hybrid capacitor 126. The microcontroller 128 is configured to display the state of charge on a display 135 to inform the user.

The microcontroller 128 also comprises a Bluetooth® module for sending state of charge and usage data to other devices, such as a user's phone or computer for tracking usage of the device.

Figure 3:
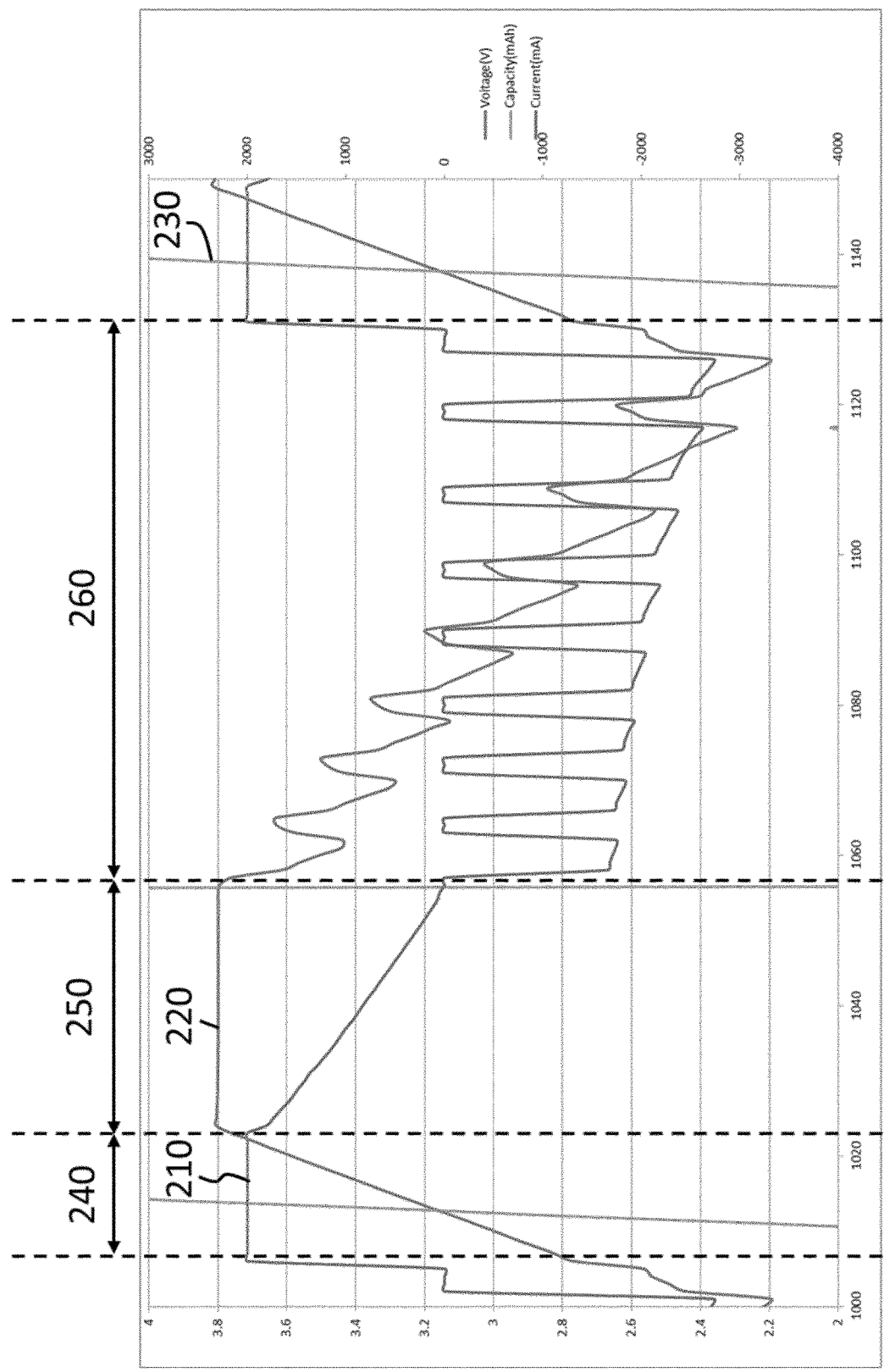
FIG. 3 illustrates a typical charging and discharging profile for a hybrid capacitor power supply of the aerosol-generating device of FIG. 1.

FIG. 3 shows a standard charging and discharging profile for the hybrid capacitor 126 of FIG. 1. FIG. 3 shows the charging voltage 210, the charging current 220 and the total discharge capacity 230 of the hybrid capacitor 126.

The charging profile consists of an initial constant current charging phase 240. During the constant current phase 240 the charging voltage 220 is controlled so as to provide constant, charging current $I_{ch}$, which in this example is about 2 A. This is achieved by switching the switch mode power converter on to apply a voltage pulse from the battery to the power converter at a maximum duty cycle. This provides for the maximum rate of charging. However, the constant charging current phase 240 comes to an end when the charging voltage 220 from the battery that is required to maintain the charging current exceeds a maximum charging voltage $V_{ch}$, which in this example is about 3.8 V. Once this stage is reached, a constant voltage charging phase 250 begins. During the constant voltage phase 250 the charging voltage 220 is held at the maximum $V_{ch}$. During the constant voltage phase 250, the charging current 220 drops as the difference between the charging voltage 220 and the voltage of the hybrid capacitor drops. The charging process is stopped when the charging current 210 reaches a low threshold $I_{end}$, which in this example is 50 mA. The maximum charging current and the maximum charging voltage are set by the hybrid capacitor manufacturer.

Once the charging current 210 has reached the low threshold $I_{end}$, the hybrid capacitor has sufficient charge for a session of aerosol-generation. A session of aerosol-generation typically comprises between 7 and 14 puffs on the aerosol-generating device, with each puff lasting for about 3 seconds. The aerosol-generating device may indicate to a user that the hybrid capacitor 126 has sufficient charge for an aerosol-generating session by illuminating an LED on the housing of the device.

When the charging current 210 reaches the low threshold $I_{end}$, the charging device stops charging the hybrid capacitor. However, it will be appreciated that in some embodiments the charging device may continue to charge the hybrid capacitor until the charging current reaches zero, or the aerosol-generating device is removed from the charging device by a user.

When the aerosol-generating device is removed from the charging device for use, the hybrid capacitor is discharged in a heating phase. The charging profile shown in FIG. 3 further comprises such a heating phase 260. During the heating phase 260, a user takes a series of puffs on the aerosol-generating device. Each puff lasts for a period of about 3 s. When the microprocessor of the aerosol-generating device detects a puff on the aerosol-generating device, the microprocessor closes the switch 133 to supply a high power pulse from the hybrid capacitor to the heater 134 to generate aerosol. The pulse lasts for the 3 s duration of the puff, and each puff consumes about 15 J. Each pulse incrementally reduces the voltage of the hybrid capacitor until a lower voltage limit is reached, in this example the lower voltage limit is 2.2 V. When the hybrid capacitor voltage reaches the lower voltage limit, the hybrid capacitor is unable to deliver sufficient energy to the heater for another pulse. In this example, the hybrid capacitor has stored sufficient energy to supply the heater with seven pulses, corresponding to seven puffs by the user. In preferred embodiments, the hybrid capacitor stores sufficient energy to supply the heater with fourteen pulses, corresponding to fourteen puffs by the user.

It will be appreciated that the features described above in relation to the electrically operated aerosol-generating system may also be suitable for other electrically operated systems. In particular, other electrically operated aerosol-generating systems may comprise an aerosol-generating device comprising a power supply having one or more hybrid capacitors and a charging device having a voltage source for supplying power to the one or more hybrid capacitors of the device.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. An electrically operated aerosol-generating system for receiving an aerosol-forming substrate, the system comprising:
   one or more electric aerosol-generating elements;
   one or more hybrid capacitors configured to supply power to the one or more electric aerosol-generating elements;
   a voltage source configured to supply power to the one or more hybrid capacitors to charge the one or more hybrid capacitors; and
   an aerosol-generating device comprising electric circuitry configured to adjust a supply of power to the one or more electric aerosol-generating elements from a high power to a low power in two or more stages over a duration of a puff.

2. The electrically operated aerosol-generating system according to claim 1,
   wherein the aerosol-generating device further comprises:
   the one or more electric aerosol-generating elements, and
   the one or more hybrid capacitors,
   the system further comprising a charging device comprising the voltage source.

3. The electrically operated aerosol-generating system according to claim 2, wherein:
   the charging device further comprises electric circuitry configured to control a supply of power from the voltage source to the one or more hybrid capacitors, and the electric circuitry of the aerosol-generating device is further configured to control the supply of power from the one or more hybrid capacitors to the one or more electric aerosol-generating elements.

4. The electrically operated aerosol-generating system according to claim 3, wherein:
   the electric circuitry of the charging device is further configured to supply power from the voltage source to the one or more hybrid capacitors during a charging mode, and
   the electric circuitry of the aerosol-generating device is further configured to supply power from the one or more hybrid capacitors to the one or more aerosol-generating elements during a heating mode.

5. The electrically operated aerosol-generating system according to claim 4, wherein the electric circuitry of the charging device is further configured to supply power from the voltage source to the one or more hybrid capacitors at a constant current until a voltage reaches a predetermined value during the charging mode.

6. The electrically operated aerosol-generating system according to claim 4, wherein the electric circuitry of the charging device is further configured to supply power from the voltage source to the one or more hybrid capacitors at a constant current until a voltage reaches a predetermined value of voltage, and to subsequently supply power from the voltage source to the one or more hybrid capacitors at a constant voltage at least until the current reaches a predetermined value of current, during the charging mode.

7. The electrically operated aerosol-generating system according to claim 4, wherein the electric circuitry of the aerosol-generating device is further configured to supply power from the one or more hybrid capacitors to the one or more aerosol-generating elements in pulses of a given duration during the heating mode.

8. The electrically operated aerosol-generating system according to claim 7, wherein the electric circuitry of the aerosol-generating device is further configured to adjust a supply of power to the one or more aerosol-generating elements by pulse frequency modulation or by pulse width modulation.

9. The electrically operated aerosol-generating system according to claim 4, wherein the aerosol-generating device and the charging device are electrically connected to one another during the charging mode and electrically disconnected from one another during the heating mode.

10. The electrically operated aerosol-generating system according to claim 1, wherein the one or more hybrid capacitors are lithium ion capacitors.

11. An electrically operated aerosol-generating device for an electrically operated aerosol-generating system according to claim 1, the device comprising:
- a housing having a cavity configured to receive an aerosol-generating article comprising an aerosol-forming substrate;
- one or more electric aerosol-generating elements arranged at or around the cavity; and
- one or more hybrid capacitors configured to supply power to the one or more electric aerosol-generating elements.

12. The electrically operated aerosol-generating device according to claim 11, the device further comprising electric circuitry configured to:
- control a supply of power from the one or more hybrid capacitors to the one or more electric aerosol-generating elements, the one or more hybrid capacitors being discharged through the one or more aerosol-generating elements in a heating mode.

13. A method of charging an aerosol-generating device comprising a hybrid capacitor power supply, the method comprising:
- comparing an output voltage of one or more hybrid capacitors with a threshold voltage;
- when the output voltage from the one or more hybrid capacitors is equal to or greater than a threshold voltage, charging the one or more hybrid capacitors using a constant charging current, and reducing a charging current when either a charging voltage applied to the one or more hybrid capacitors reaches a predetermined maximum permitted voltage or the output voltage from the one or more hybrid capacitors is less than the threshold voltage; and
- when the charging voltage applied to the one or more hybrid capacitors reaches a maximum permitted voltage or the output voltage from the one or more hybrid capacitors is less than the threshold voltage, reducing the charging current to maintain the charging voltage applied to the one or more hybrid capacitors at or close to the maximum permitted voltage.

\* \* \* \* \*